(12) United States Patent
Saito et al.

(10) Patent No.: US 12,712,581 B2
(45) Date of Patent: Aug. 18, 2026

(54) SEMICONDUCTOR DEVICE

(71) Applicant: Renesas Electronics Corporation, Tokyo (JP)

(72) Inventors: Wataru Saito, Tokyo (JP); Fukashi Morishita, Tokyo (JP)

(73) Assignee: Renesas Electronics Corporation, Tokyo (JP)

( * ) Notice: Subject to any disclaimer, the term of this patent is extended or adjusted under 35 U.S.C. 154(b) by 295 days.

(21) Appl. No.: 18/397,714

(22) Filed: Dec. 27, 2023

(65) Prior Publication Data

US 2024/0267068 A1 Aug. 8, 2024

Related U.S. Application Data

(60) Provisional application No. 63/443,558, filed on Feb. 6, 2023.

(51) Int. Cl.
*H04B 1/10* (2006.01)
*H04B 1/40* (2015.01)

(52) U.S. Cl.
CPC ............. *H04B 1/1027* (2013.01); *H04B 1/40* (2013.01)

(58) Field of Classification Search
CPC ..... H04B 1/1027; H04B 1/40; G06F 3/04162; G06F 3/03545; H03M 1/1245
See application file for complete search history.

(56) References Cited

U.S. PATENT DOCUMENTS

| | | | | |
|---|---|---|---|---|
| 2015/0349869 | A1* | 12/2015 | Sun | H04B 7/0871 455/132 |
| 2016/0241212 | A1* | 8/2016 | Gore | H03F 3/24 |
| 2017/0371478 | A1* | 12/2017 | Hirai | G06F 3/046 |
| 2019/0102034 | A1* | 4/2019 | Nam | G06F 3/041661 |
| 2024/0146347 | A1* | 5/2024 | Schmidt | H04B 1/109 |
| 2024/0267068 | A1* | 8/2024 | Saito | H04B 1/40 |

OTHER PUBLICATIONS

Changbyung Park, et al., “A Pen-Pressure-Sensitive Capacitive Touch System Using Electrically Coupled Resonance Pen”, 2016 JSSC.
SangYun Kim, et al., “A 39.5-dB SNR, 300-Hz Frame-Rate, 56×70-Channel Read-Out IC for Electromagnetic Resonance Touch Panels”, 2018, IEEE Transactions on Industrial Electronics.
Jun-Eun Park, et al., “Noise-Immunity-Enhanced Analog Front-End for 36×64 Touch-Screen Controllers With 20-VPP Noise Tolerance at 100 kHz”, 2019, JSSC.

* cited by examiner

*Primary Examiner* — Md K Talukder
(74) *Attorney, Agent, or Firm* — Rimon P.C.

(57) ABSTRACT

The circuit area of the semiconductor device in which the transmission period and the reception period are alternately repeated is reduced. The semiconductor device includes a transmission circuit and a receiving circuit. The receiving circuit includes a gain control circuit that samples the input signal to adjust the gain of the receiving circuit during the reception period and adjusts the gain based on the sampling result during the transmission period.

5 Claims, 21 Drawing Sheets

111 induced electromotive voltage x

12

TX/RX

TX/RX

51

521

52

522

10
11
C1
L1
X
12
15
13
14

10
11
12
13
14
to ADC
C2
L2
R
(1)
(2)
(3)
(4)
(5)
W1
W2
W3
T_TX
T_RX 14
141
BPF
142
PGA
143
ADC
Input range

FIG. 6

14a
142
PGA
143
ADC
Input range 14
141
142
143
BPF
PGA
ADC
Input range

PGA

143

ADC

Input range

Input range
14
BPF
PGA
ADC
FFT
Amplitude Ratio
Pen signal
Frequency
Input range
14a
PGA
ADC
FFT
Actual pen signal
Amplitude Ratio
Frequency

Figure 13:
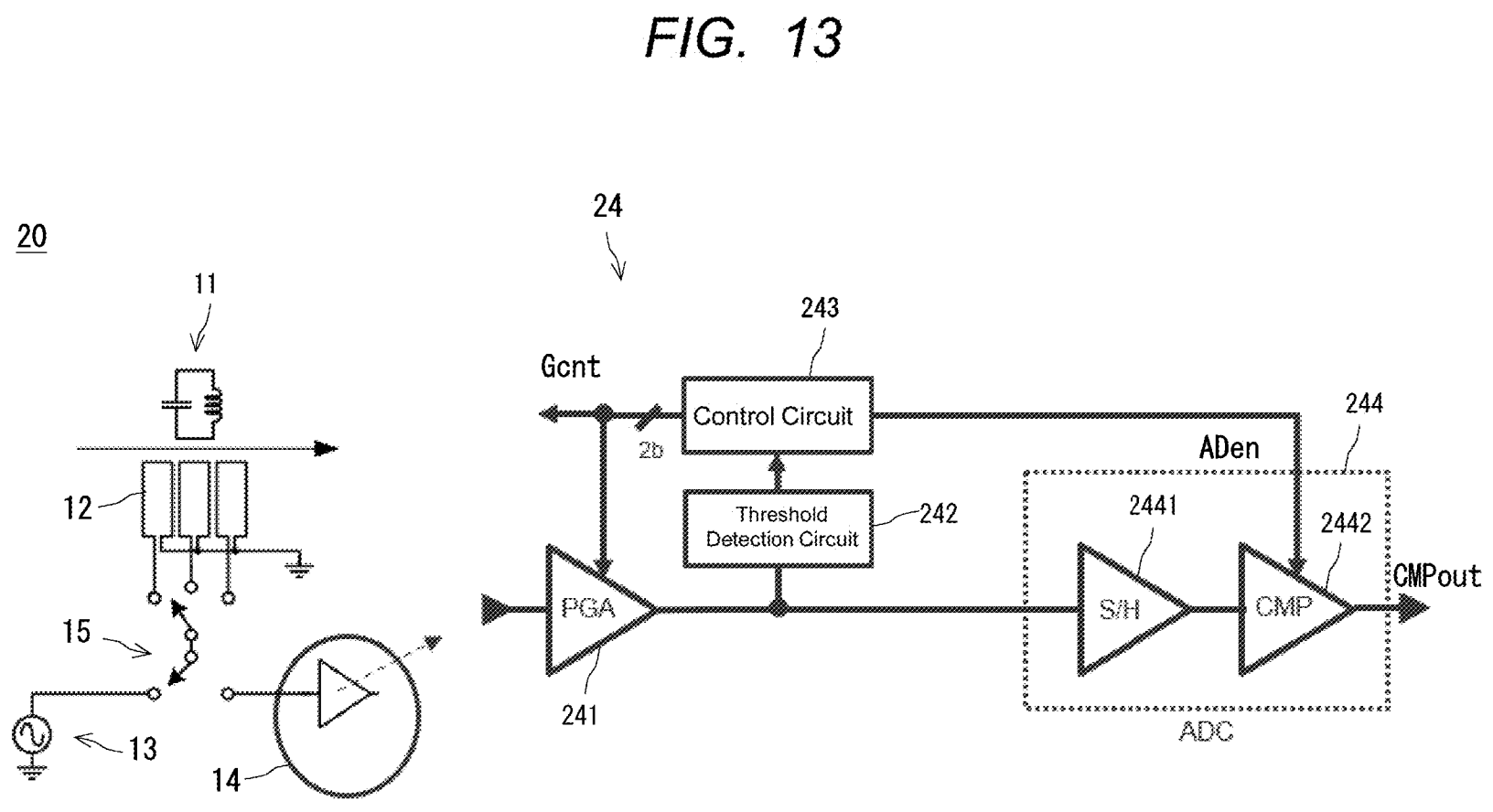

Gcnt

2b

PGA

241

Control Circuit

243

Threshold Detection Circuit

242

S/H

2441

CMP

2442

ADen

ADC

244

CMPout

Figure 15:
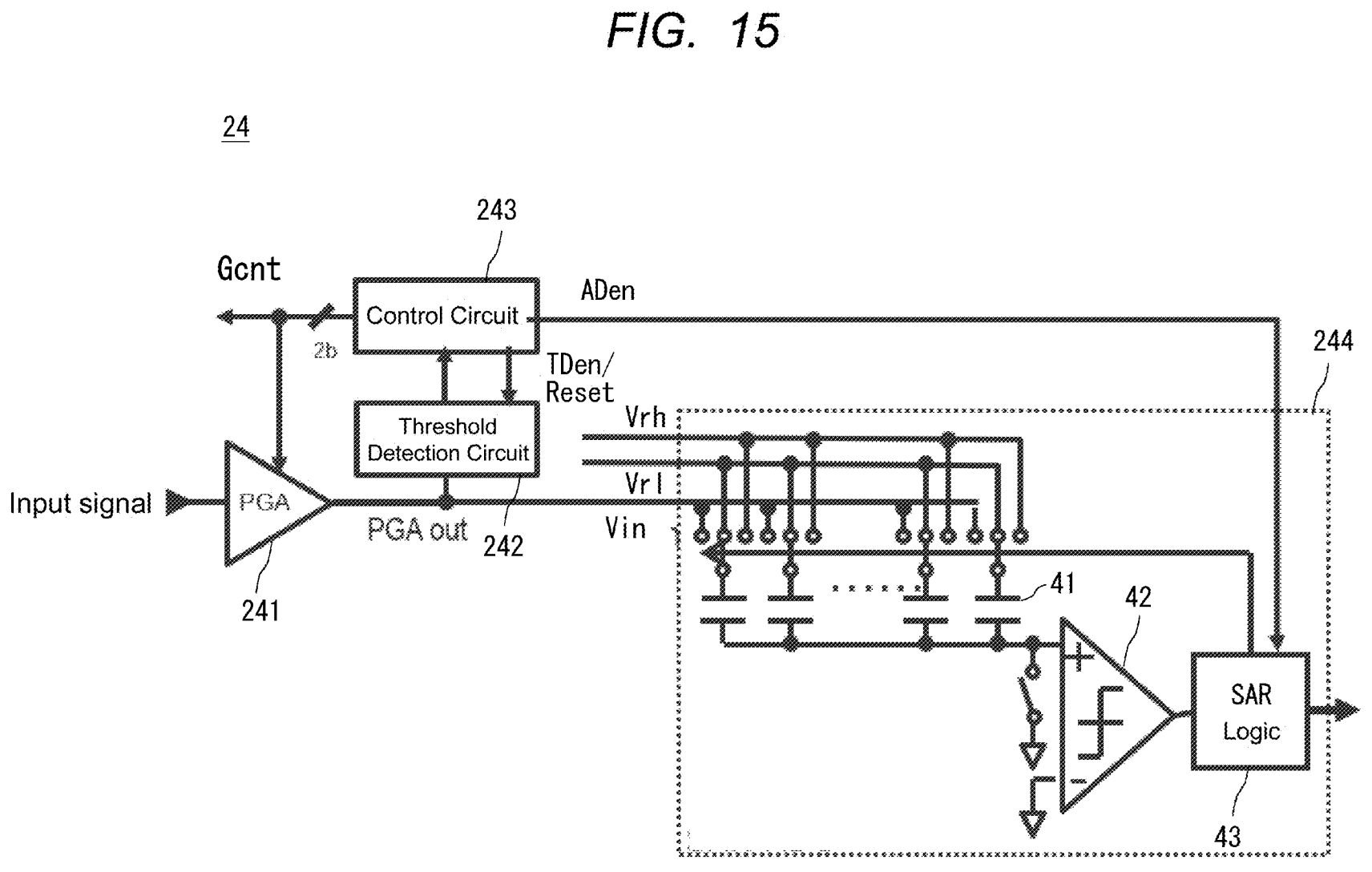

Gcnt

2b

Input signal

PGA

241

PGA out

Control Circuit

243

Threshold Detection Circuit

242

ADen

TDen/ Reset

Vrh

Vrl

Vin

244

41

42

SAR Logic

Figure 17:
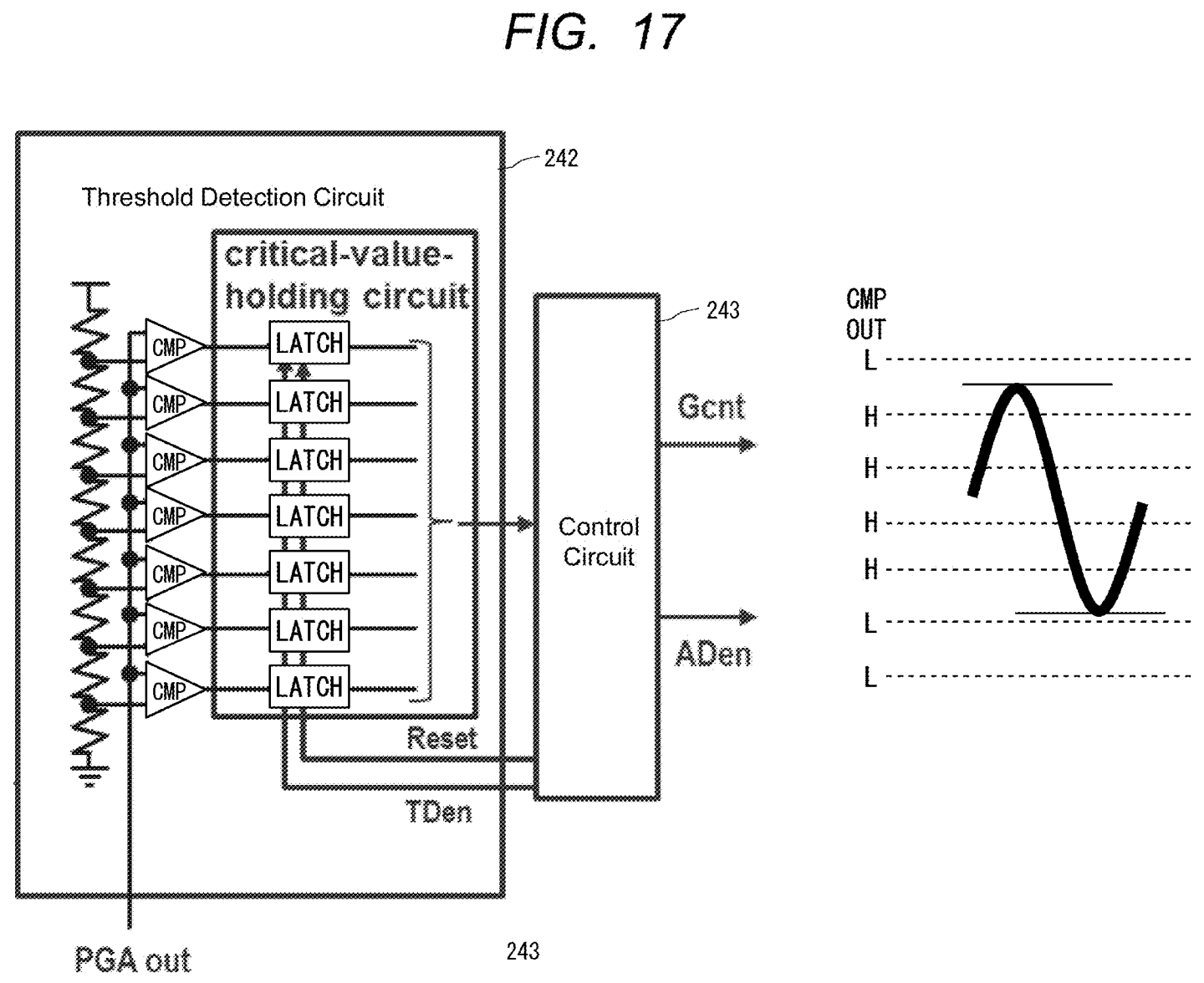

242
Threshold Detection Circuit
critical-value-holding circuit
CMP
LATCH
Reset
TDen
PGA out
243
Control Circuit
Gcnt
ADen
CMP OUT
L
H
H
H
H
L
L

FIG. 18

SEMICONDUCTOR DEVICE

CROSS-REFERENCE TO RELATED APPLICATIONS

The subject application claims benefit of provisional U.S. Patent Application No. 63/443,558 filed on Feb. 6, 2023. The entire disclosure of U.S. Patent Application No. 63/443,558 is incorporated by this reference.

BACKGROUND

The present invention relates to a semiconductor device including a transmission circuit and a receiving circuit.

There are techniques for detecting coordinates of an electronic pen by an electromagnetic induction method are disclosed below.

[Non-Patent Document 1] Changbyung Park, et al., "A Pen-Pressure-Sensitive Capacitive Touch System Using Electrically Coupled Resonance Pen", 2016 JSSC

[Non-Patent Document 2] SangYun Kim, et al., "A 39.5-dB SNR, 300-Hz Frame-Rate, 56×70-Channel Read-Out IC for Electromagnetic Resonance Touch Panels", 2018, IEEE TRANSACTIONS ON INDUSTRIAL ELECTRONICS

[Non-Patent Document 3] Jun-Eun Park, et al., "Noise-Immunity-Enhanced Analog Front-End for 36×64 Touch-Screen Controllers With 20-VPP Noise Tolerance at 100 kHz", 2019, JSSC

SUMMARY

Noise may be mixed into the signal received by the receiving circuit. Since there is a BPF (Band Pass Filter for removing the noises, there is a problem in that the area of the receiver is large.

Other objects and novel features will become apparent from the description of this specification and the accompanying drawings.

A semiconductor device according to an embodiment includes a transmission circuit that transmits an analog signal, and a receiving circuit that receives a signal generated by an object by the analog signal as an input signal, wherein a transmission period of transmitting the analog signal and a reception period of receiving the input signal are alternately repeated, and the receiving circuit includes a gain control circuit that samples the input signal to adjust a gain of the receiving circuit during the reception period, and adjusts the gain based on a sampling result during the transmission period.

According to the embodiment, it is possible to reduce the circuit area of the semiconductor device in which the transmission period and the reception period are alternately repeated.

BRIEF DESCRIPTION OF THE DRAWINGS

FIG. 1 is a diagram explaining an outline of technique for detecting an electronic pen by an electromagnetic induction method.

FIG. 6 is a diagram for explaining the operation during normal use of the receiving circuit according to the examination example.

FIG. 8 is a diagram for explaining the operation of the receiving circuit in use of the call according to the examination example.

FIG. 13 is a diagram for explaining a configuration of a semiconductor device according to a first embodiment.

FIG. 15 is a diagram for explaining a configuration of a gain control circuit according to a second embodiment.

FIG. 17 is a diagram for explaining an example of a configuration of a threshold detection circuit according to a second embodiment.

FIG. 18 is a diagram for explaining a configuration of a gain control circuit according to a third embodiment.

DETAILED DESCRIPTION

Figure 2:
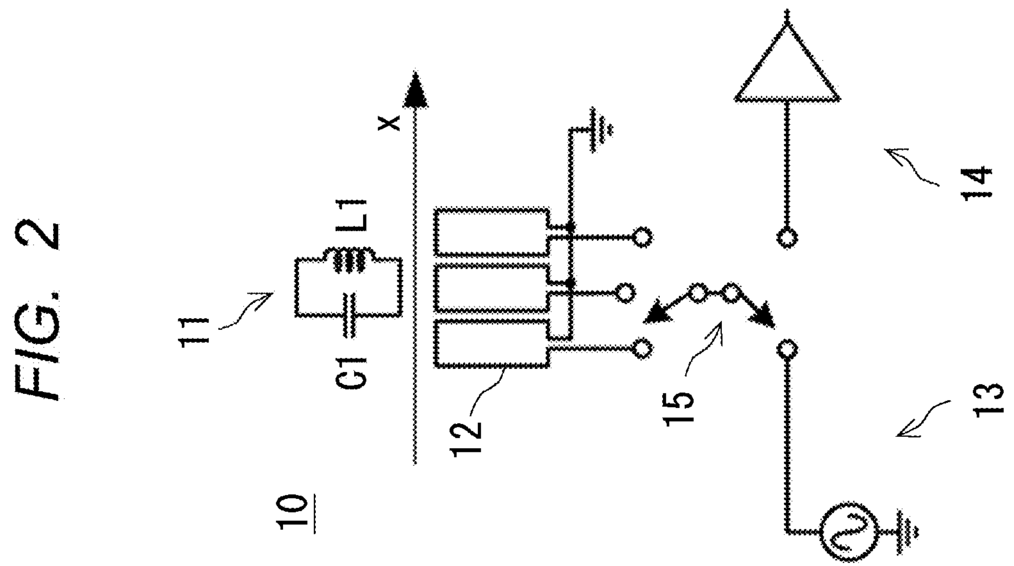
FIG. 2 is a diagram explaining an outline of a transmission circuit and a receiving circuit for use in the electromagnetic induction system.

For clarity of explanation, the following description and drawings are appropriately omitted and simplified. In addition, the elements described in the drawings as functional blocks for performing various processes can be configured as CPUs (Central Processing Unit), memories, and other circuits in terms of hardware, and are realized by programs loaded into the memories in terms of software. Accordingly, those skilled in the art will appreciate that these functional blocks can be implemented in various forms by hardware, software running on hardware, or a combination thereof, and are not limited thereto. In the drawings, the same elements are denoted by the same reference numerals, and a repetitive description thereof is omitted as necessary.

The above-described program also includes instructions (or software code) for causing a computer to perform one or more of the functions described in the embodiments when the program is loaded into the computer. The program may be stored in a non-transitory computer-readable medium or a tangible storage medium. By way of example, and not limitation, computer-readable media or tangible storage media include Random Access Memory (RAM), Read Only Memory (ROM), flash memory, Solid State Drive (SSD) or other memory techniques, CD-ROM, Digital Versatile Disc (DVD), Blu-ray disk or other optical disk storage, magnetic cassettes, magnetic tape, magnetic disk storage or other magnetic storage devices. The program may be transmitted on a transitory computer readable medium or a communication medium. By way of example, and not limitation, transitory computer-readable media or communication media include electrical, optical, acoustic, or other forms of propagated signals.

Figure 1:
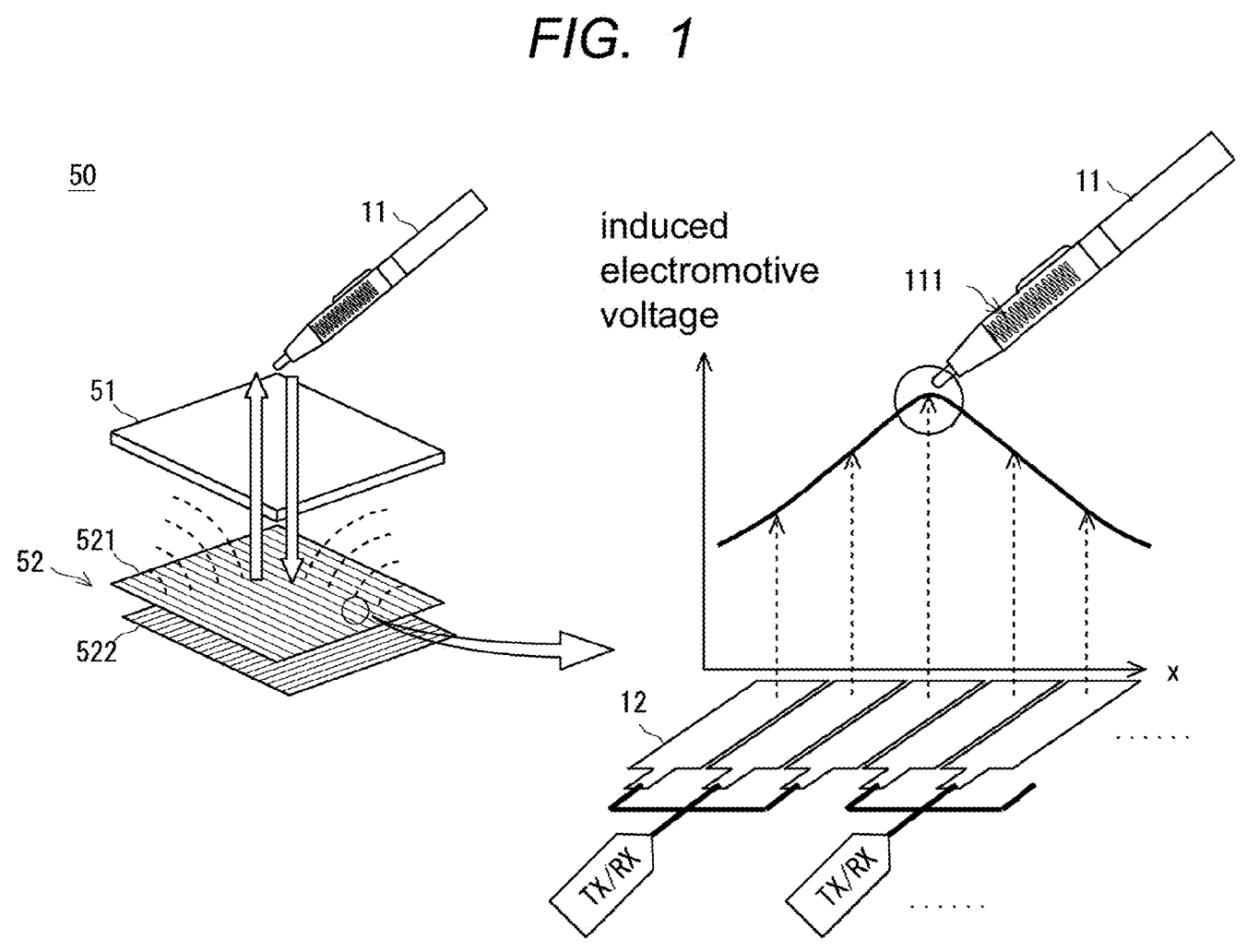

FIG. 1 shows an outline of a technique for detecting an electronic pen in an electromagnetic induction system. Referring to the left drawing, the pen tablet 50 includes an electronic pen 11, a liquid crystal panel 51, and a sensor board 52. The sensor board 52 includes a substrate 521 for detecting the x-coordinate of the electronic pen 11 and a substrate 522 for detecting the y-coordinate of the electronic pen 11. The board 521 and the board 522 transmit an analog signal (also referred to as a transmission signal) to the electronic pen 11 and receive a signal transmitted from the electronic pen 11. Referring to the right figure, a plurality of antenna coils 12 are arranged in the x direction. The plurality of antenna coils 12 are provided on the substrate 521. The graph shows the magnitude of the induced electromotive voltage generated in each antenna coil 12. The coil 111 provided in the electronic pen 11 generates a magnetic field and causes an induced current to flow through the antenna coil 12 around the tip of the electronic pen 11. When the electromagnetic induction method is used, the battery of the electronic pen 11 is unnecessary.

FIG. 2 is a diagram for explaining an outline of a transmission circuit and a receiving circuit used in the electromagnetic induction method. The semiconductor device 10 includes an electronic pen 11, an antenna coil 12 for the X-axis, a transmission circuit 13, a receiving circuit 14, and a changeover switch 15. The electronic pen 11 includes a capacitor C1 and a coiled L1. The capacitor C1 and the coil L1 constitute a resonant circuit. A plurality of antenna coils 12 are arranged in the x direction. The changeover switch 15 switches the antenna coil 12 connected to the transmission circuit 13 or the receiving circuit 14. Further, the changeover switch 15 switches the connection destination of the antenna coil 12 between the transmission circuit 13 and the receiving circuit 14.

Figure 3:
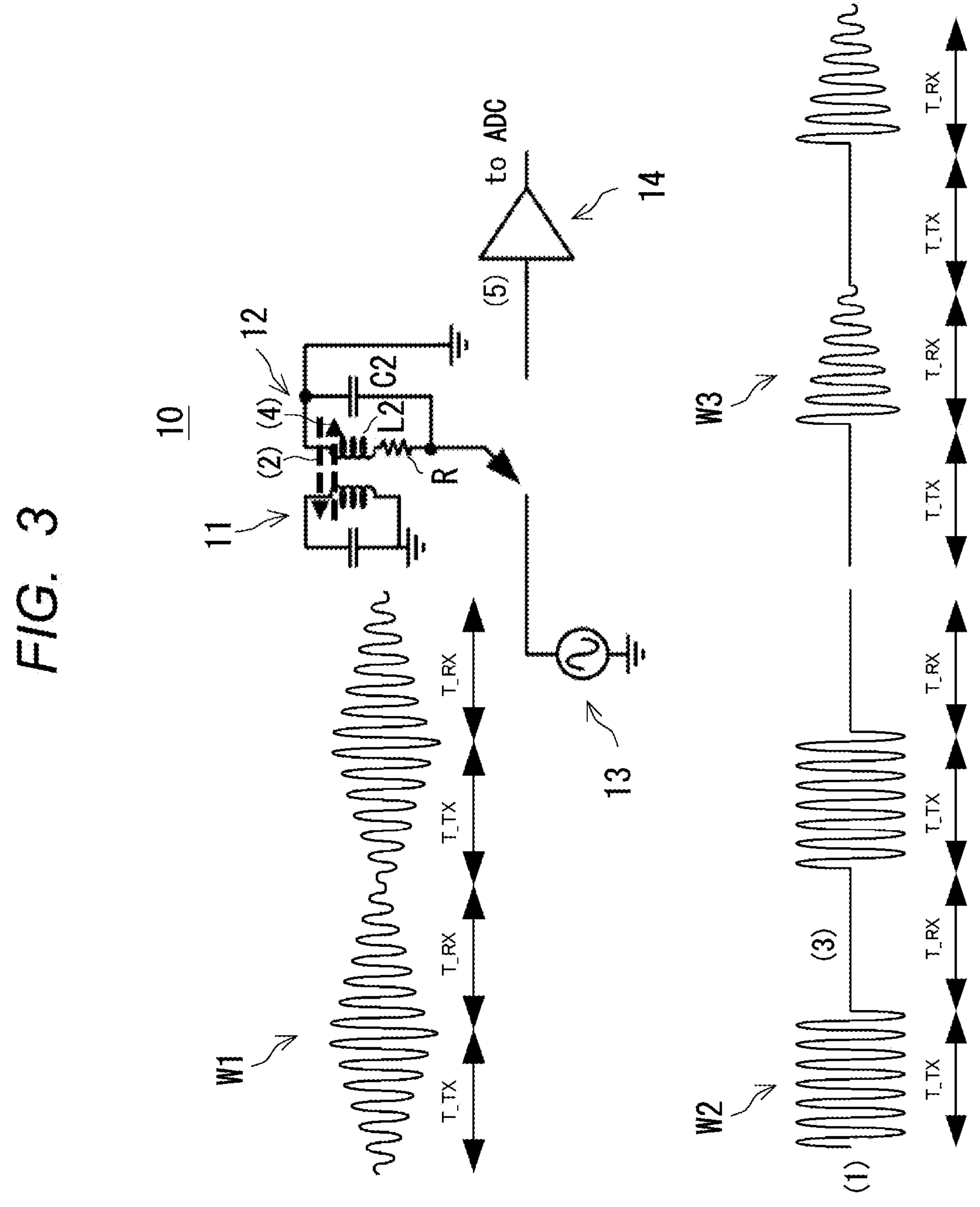
FIG. 3 is a diagram for explaining the operation of the semiconductor device according to the comparative example.

The operation of the semiconductor device 10 will be described with reference to FIG. 3. The antenna coil 12 includes a capacitor C2, a resistor R, and a coil L2. The waveform W1 represents the voltage across the capacitor C2 during the transmit and receive periods. The wave form W2 indicates the current flowing through the antenna-coil 12 during the transmitting period. The wave W3 represents the current flowing through the antenna-coil 12 during reception.

In the semiconductor device 10, first, as shown in (1), the transmission circuit 13 transmits a transmission signal (sine wave signal). Energy is then stored in the resonant circuit of the electronic pen 11, as indicated by the left arrow (2). Next, as shown in (3), the current flowing through the antenna coil 12 is stopped. Next, a signal is transmitted from the resonance circuit of the electronic pen 11 to the antenna coil 12 as indicated by the right arrow (4). Next, as shown in (5), the signal (inputted signal) received by the receiving circuitry 14 is AD (Analog Digital converted. (1) to (2) is performed in the transmission period, and (3) to (5) are performed in the reception period. The transmission period and the reception period are alternately repeated.

Figure 4:
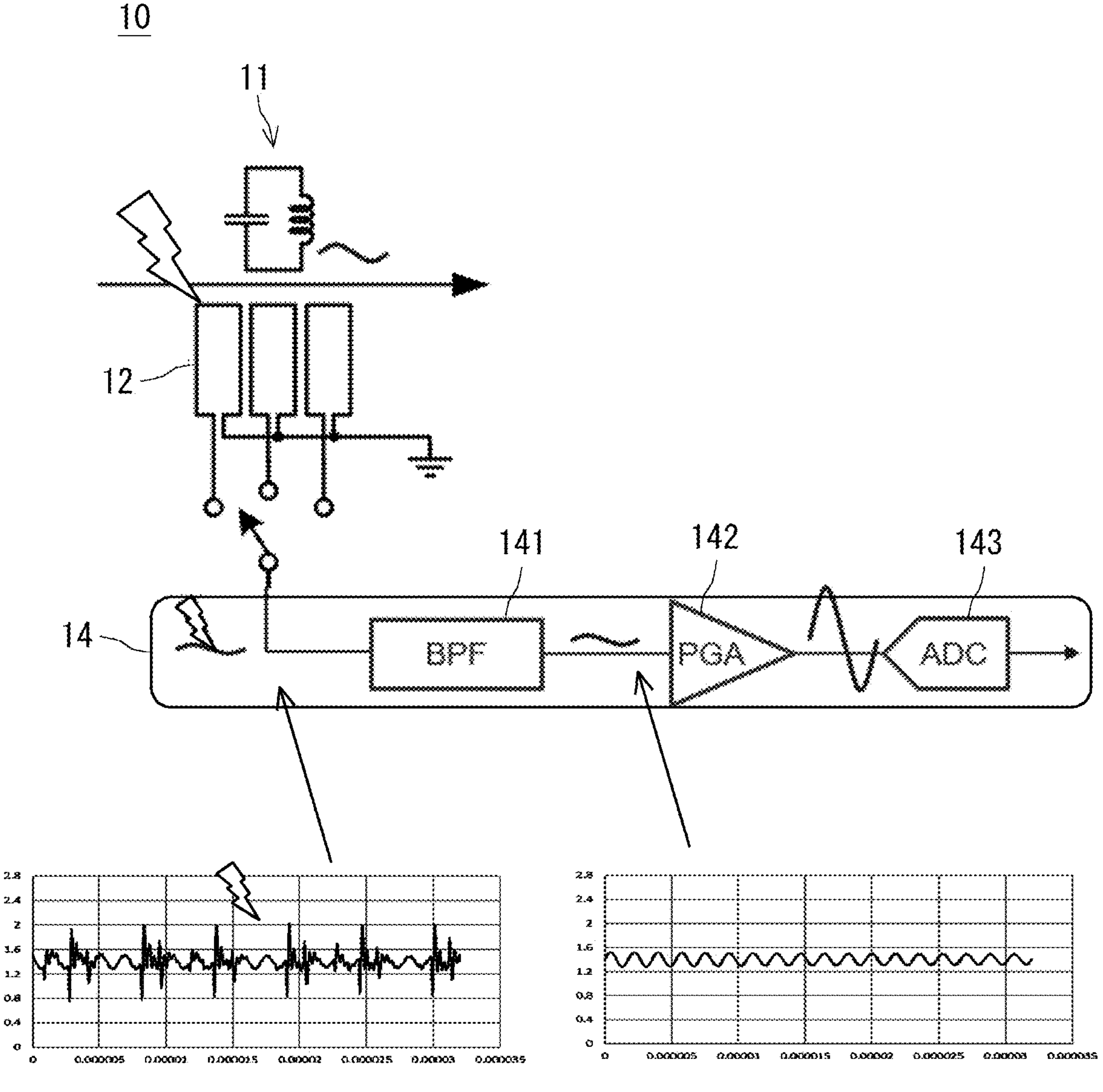
FIG. 4 is a diagram for explaining the configuration of the receiving circuit according to the comparative example.

The configuration of the receiving circuit 14 will be described with reference to FIG. 4. The receiving circuit 14 receives, as an input signal, a signal generated by an object (e.g., the electronic pen 11) by an analog signal transmitted by the transmission circuit 13. The receiver circuitry 14 includes a BPF (Band Pass Filter) 141, PGA (Programmable Gain Amplifier) 142 and a ADC (Analog Digital Converter) 143. A sinusoidal signal from the electronic pen 11 is input to the antenna coil 12, but noise may be mixed into the input signal. BPF 141 delivers the noise-removed signal to PGA 142. PGA 142 amplifies the noise-removed input signal according to the gain, and outputs the amplified input signal (amplified signal) to ADC 143. The lower left view of FIG. 4 shows the time variation of the input signal before noise is removed. The lower right figure shows the time variation of the input signal after noise is removed.

For example, when a user creates an illustration or a memo while making a call, the input signal may be noisy. In the following, the operation of the receiving circuit 14 during normal use in which the user creates an illustration without making a call and during use of a call in which the user creates an illustration or the like while making a call will be described. The operation of the receiver **14*a* not equipped with BPF 141** during normal use and during call use will also be described.

Figure 5:
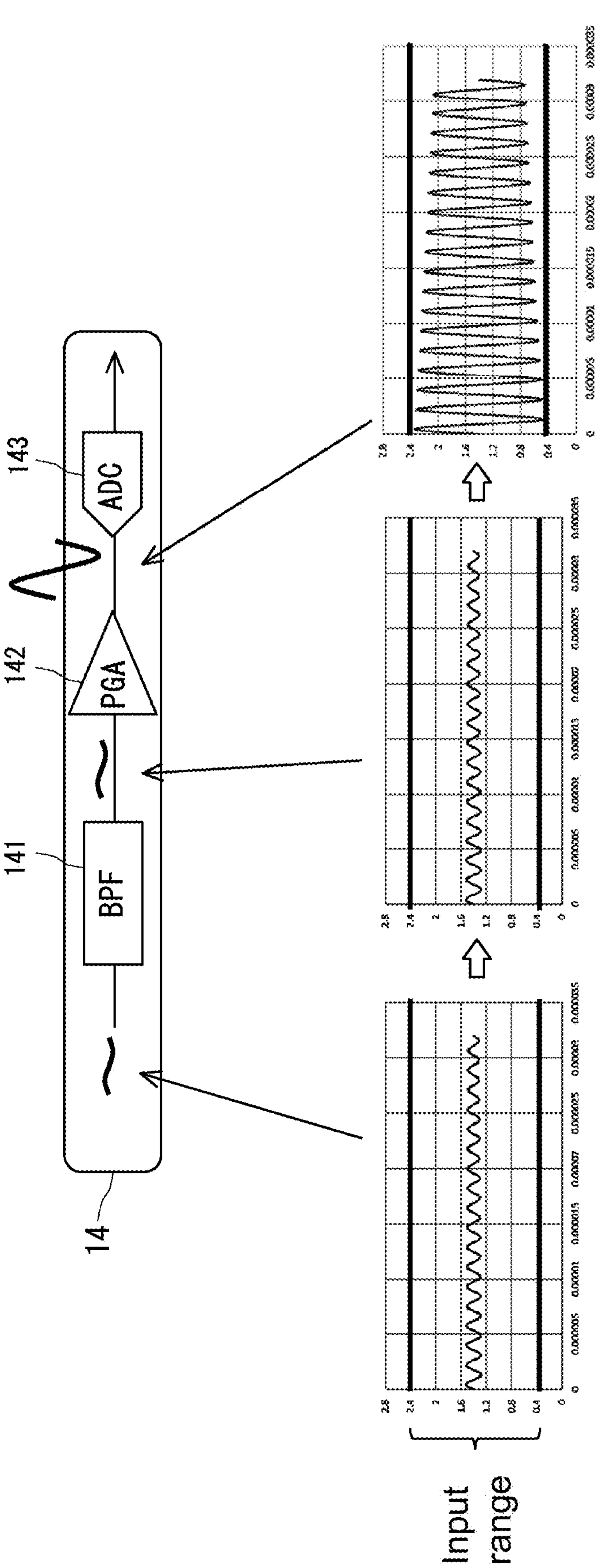
FIG. 5 is a diagram for explaining the operation during normal use of the receiving circuit according to the comparative example.

FIG. 5 is a diagram for explaining an operation of the receiving circuit 14 during normal use. The lower left figure shows the time variation of the input signal. The extent between the two laterally extending lines indicates the input range of ADC 143. The lower center diagram shows the temporal variation of the noised input-signal by BPF 141. The lower right figure shows the temporal variation of the input-signal amplified by PGA 142. The gain of PGA 142 is maximized within the input range of ADC 143.

Figure 6:
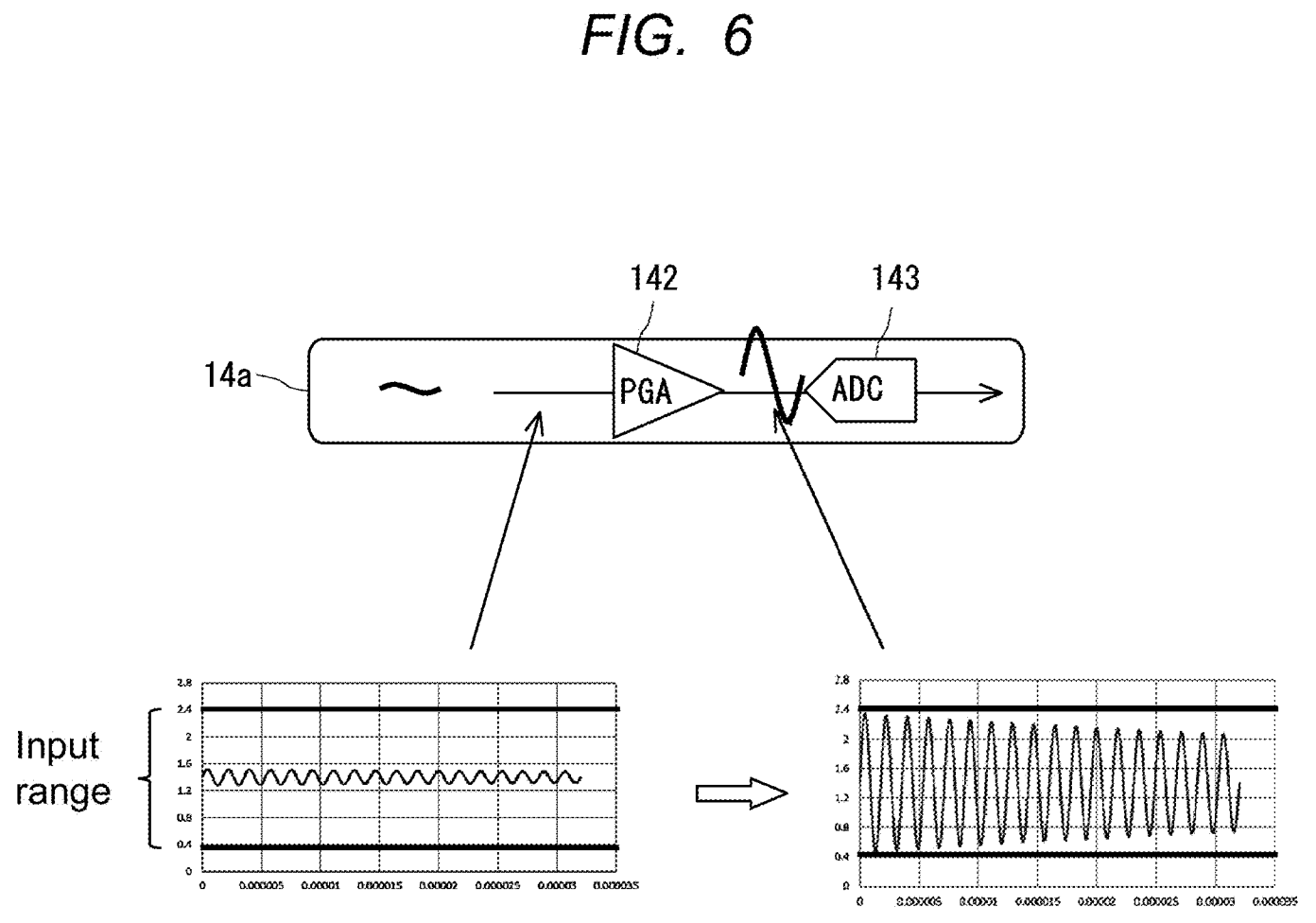

FIG. 6 is a diagram for explaining an operation of the receiver **14*a* during normal use. The lower left figure shows the time variation of the input signal. The lower right figure shows the temporal variation of the input-signal amplified by PGA 142. BPF 141** is not required during normal use, in which noises are not mixed into the incoming signal.

Figure 7:
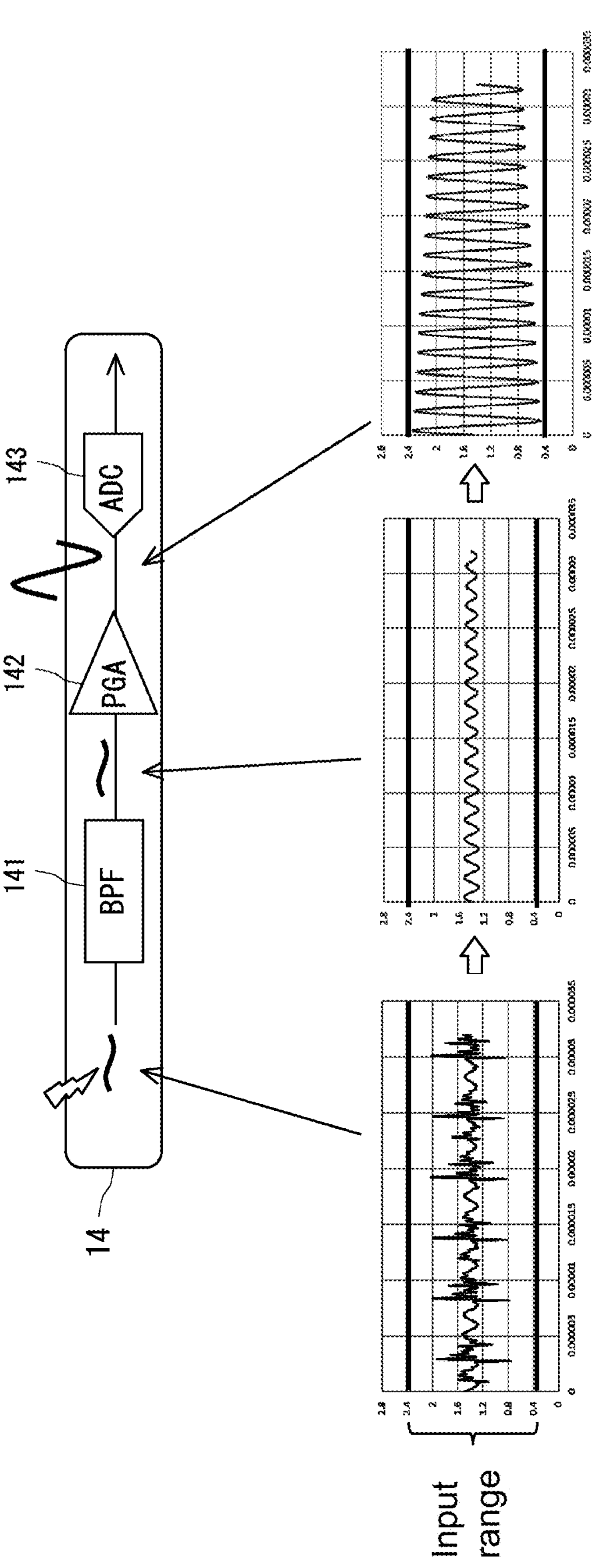
FIG. 7 is a diagram for explaining the operation of the receiving circuit in use of the call according to the comparative example.

FIG. 7 is a diagram for explaining an operation of the receiving circuit 14 when a call is used. As shown in the lower left figure, noise is mixed in the input signal. BPF 141 removes the noises in the input-signal, as shown in the middle-bottom view. Then, as shown in the lower right figure, the gain of PGA 142 is maximized.

Figure 8:
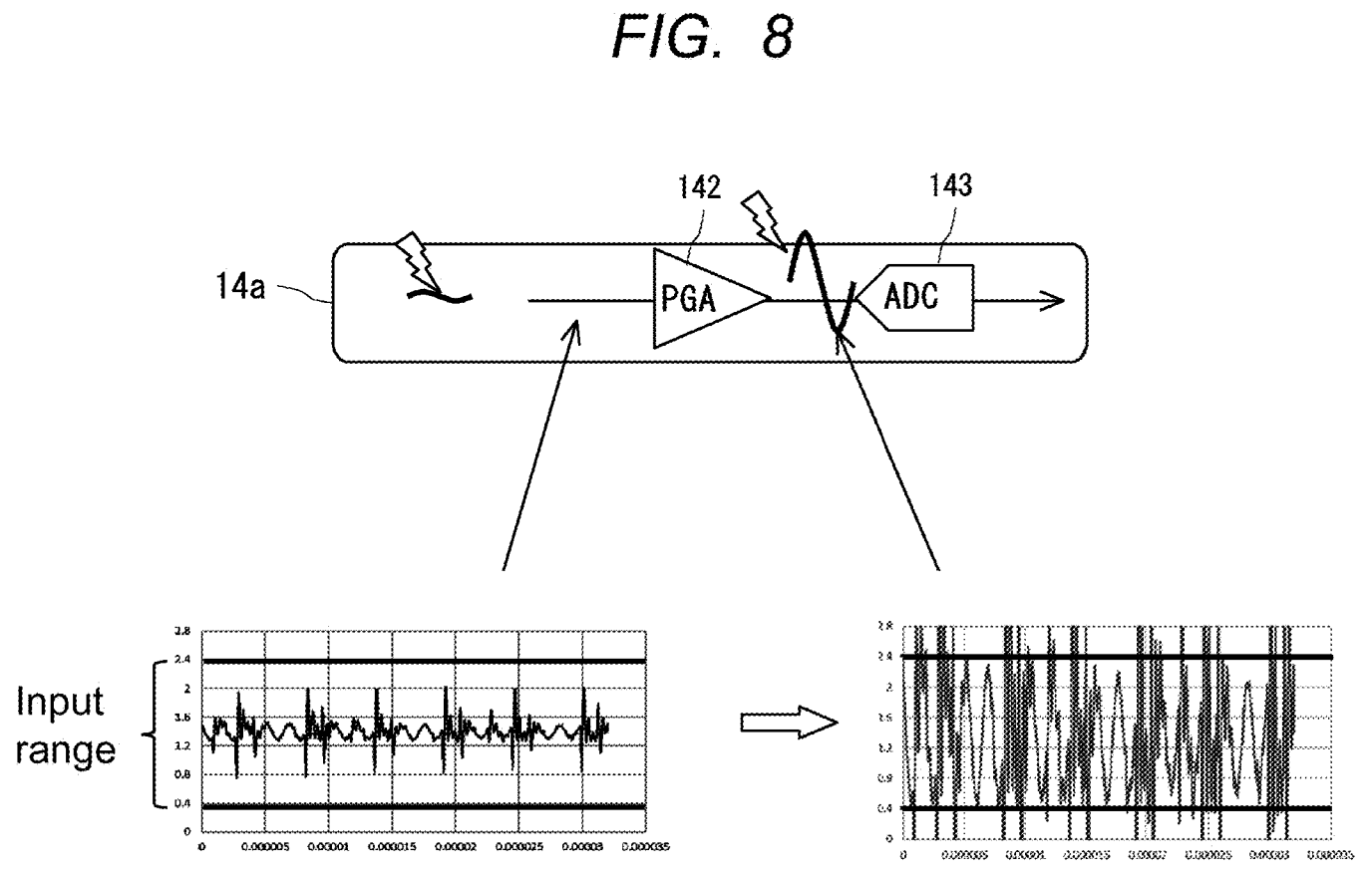

FIG. 8 is a diagram for explaining an operation of the receiving circuitry **14*a* when a call is used. As in FIG. 7, noise is mixed in the input signal. Then, the input signal mixed with noises is amplified by PGA 142, and the input signal protrudes from the input range of ADC 143**.

Figure 9:
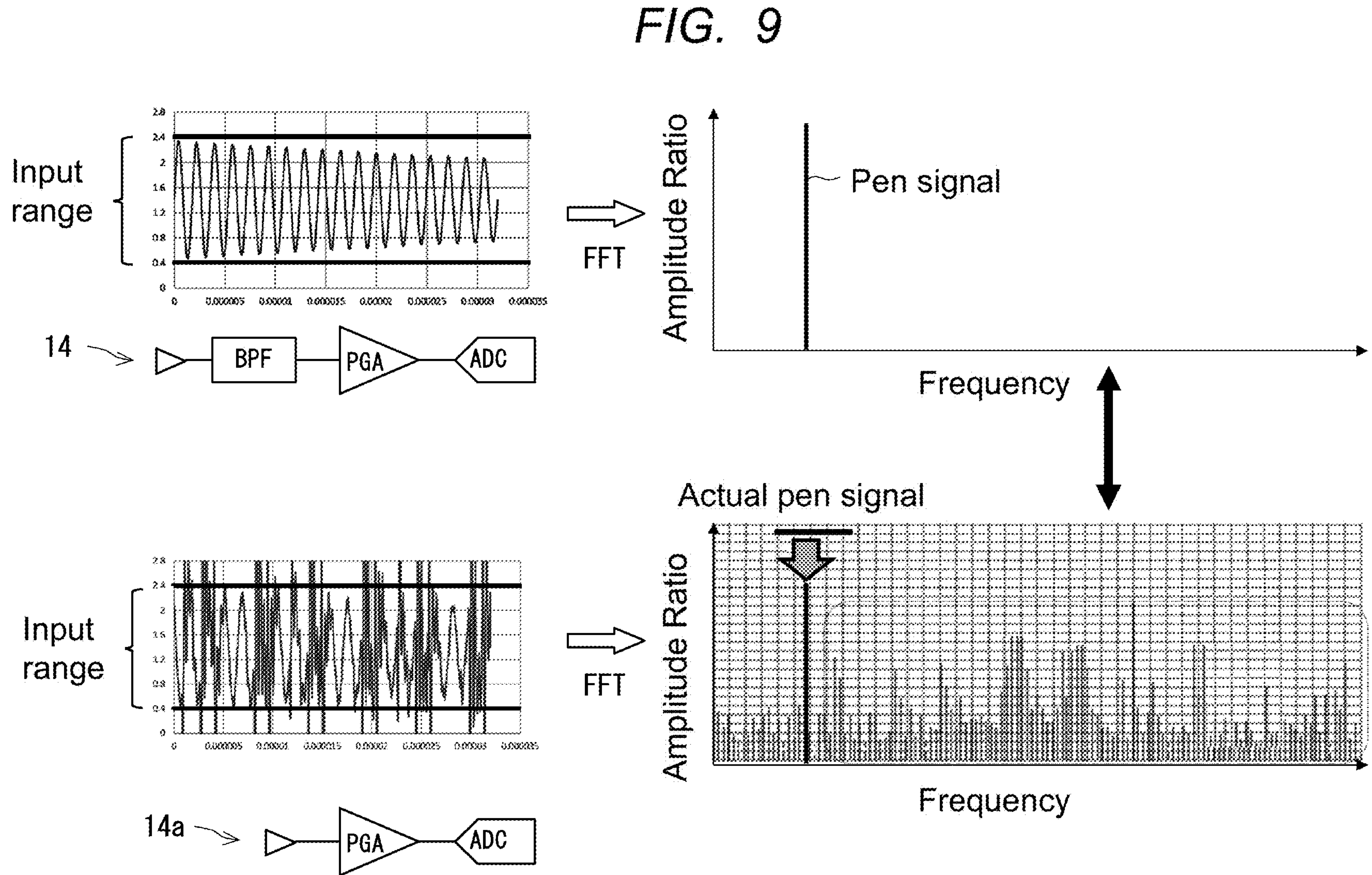
FIG. 9 is a diagram for explaining the problem of the receiving circuit according to the examination example.

Referring to FIG. 9, a first problem of the receiver **14*a* will be described. The top panel of FIG. 9 shows the frequency-analysis of FFT (Fast Fourier Transform shown in the bottom right panel of FIG. 7. Pen signal received from the electronic pen 11 has an adequate amplitude-ratio. The following figure shows FFT frequency-analysis of the signal shown in the lower right figure of FIG. 8. The horizontal line indicates the amplitude-ratio of Pen in the above figure. When the receiver 14*a*** is used, it is difficult to detect Pen signal because the amplitude-ratio of Pen signal is small and the noise-component is large as indicated by the downward arrow.

Figure 10:
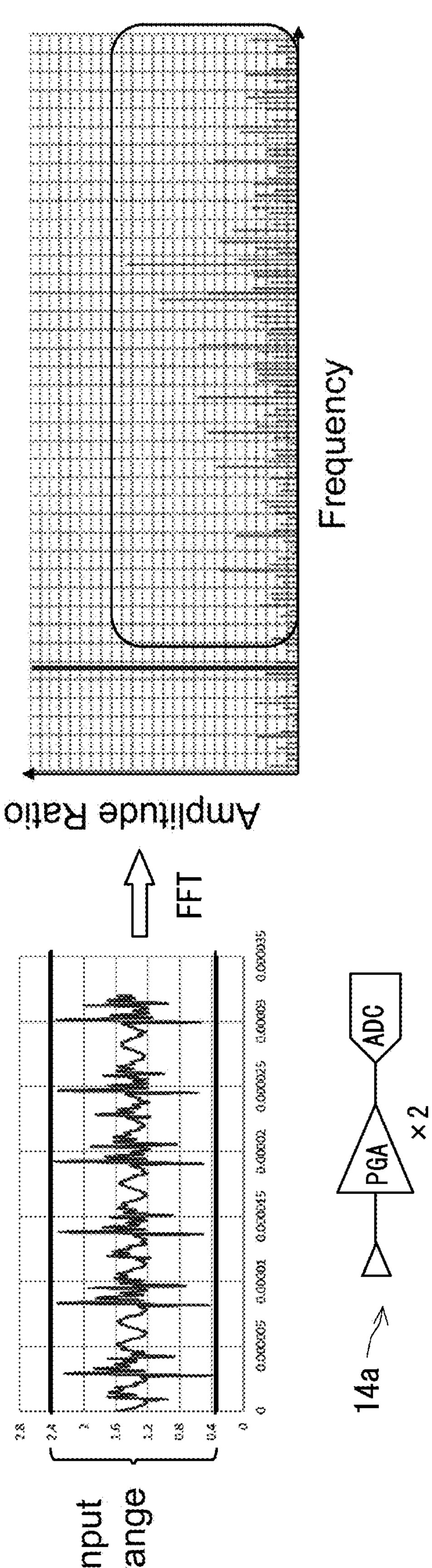
FIG. 10 is a diagram for explaining a method for detecting an input signal when a call is used by a receiving circuit.

Referring to FIG. 10, a process for detecting a Pen using a receiver **14*a* when a call is used will be described. FIG. 1 shows a time-dependent variation of an input signal that has been amplified so that all noise waveforms fall within the input range of ADC 143. FFT frequency-analysis of the input-signal shown in the left-hand diagram is shown in the right-hand diagram. The amplitude ratio of Pen signal is equivalent to the amplitude ratio of Pen signal shown in the upper drawing of FIG. 9. The outcome of FFT includes noisy components surrounded by rounded rectangles, but is capable of detecting Pen. Therefore, in the receiving circuitry 14***a*, the gain of PGA 142 needs to be appropriately set.

The present inventors have studied using AGC (Automatic Gain Control) circuitry to automatically change the gain according to the operating mode. By using AGC circuitry, the amplitude of the input signal can be maximized within the input range of ADC 143 at all times. There are analogue F/B (Feed Back) and digital F/B types of AGC circuitry.

Figure 11:
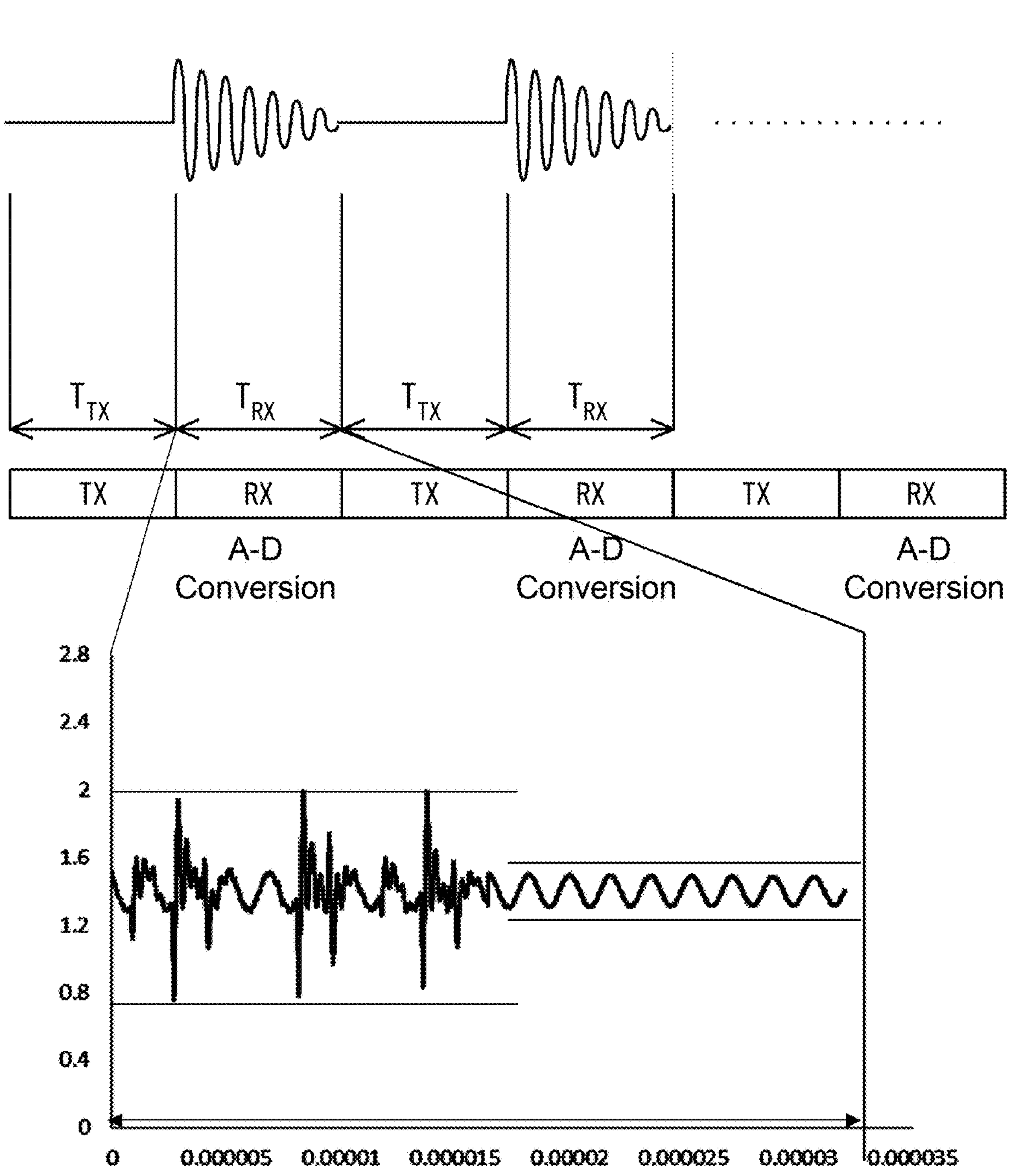
FIG. 11 is a diagram for explaining a problem when using an analogue F/B type AGC circuitry.
Figure 12:
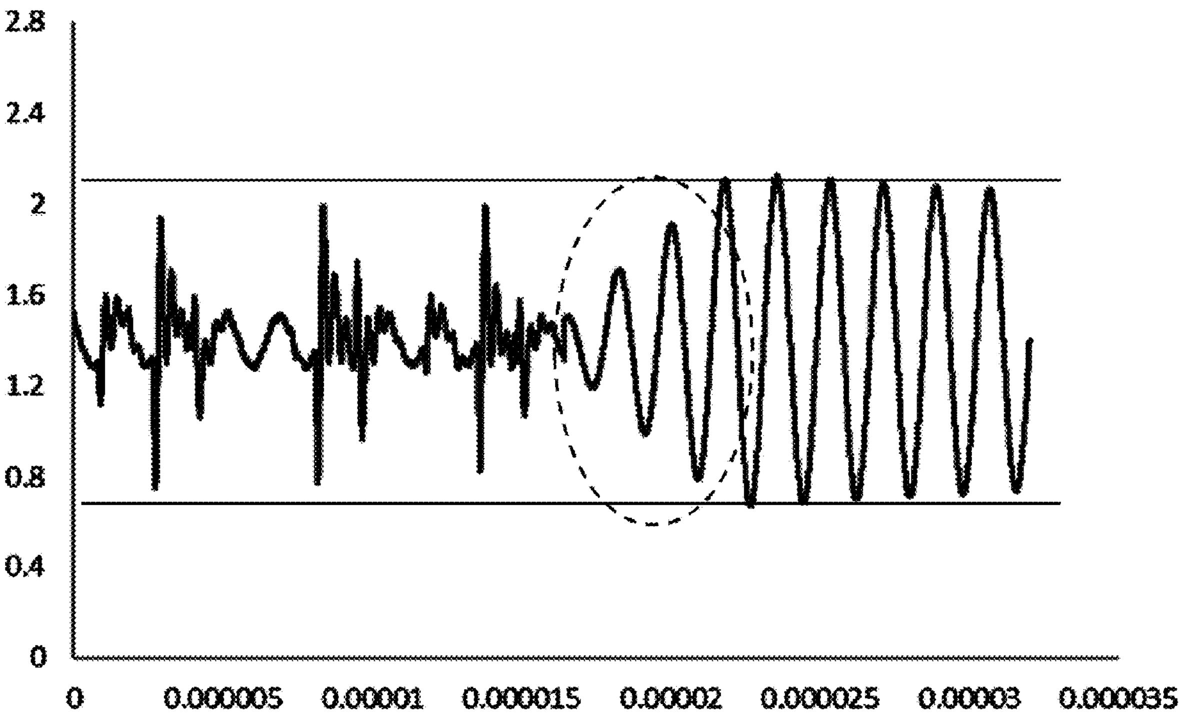
FIG. 12 is another diagram for explaining a problem when using an analogue F/B type AGC circuitry.

Referring to FIGS. 11 and 12, a problem (second problem) when an analog F/B type AGC circuit is used will be described. FIG. 11 shows a temporal change in the input signal when the noise becomes small while the user performs the input with the same pen pressure. A AD conversion is performed during reception. FIG. 12 shows the gain automatically changed using an analogue F/B type AGC circuit. AGC circuitry maximizes the input signal within the input range of ADC 143. However, the operation time of the analog F/B type AGC circuit is longer than the settling time of PGA 142, and there is a possibility that the receiving circuit 14*a* misunderstands the writing pressure in the region surrounded by the dotted line.

Further, the digital F/B type AGC circuitry AD converts the inputted signal once and DA converts AD converted signal again. Therefore, there is a problem that the circuit scale is large.

Embodiment 1

FIG. 13 is a diagram for describing a configuration of the semiconductor device 20 according to the first embodiment. The receiving circuit 14 of the semiconductor device 20 includes a gain control circuit 24. The gain control circuit 24 includes a PGA 241, a threshold detecting circuit 242, a control circuit 243, and a ADC 244. ADC 244 comprises a sample-and-hold circuitry 2441 and a voltage-comparator 2442. The gain of PGA 241 is set during the transmit period and fixed during the receive period.

PGA 241 amplifies the input-signal in accordance with the gain set by the control circuitry 243. PGA 241 outputs the amplified input signal (amplified signal) to the sample-and-hold circuitry 2441.

The threshold detection circuit 242 detects amplitude information (e.g., maximum amplitude) of the amplified signal during the reception period. The threshold detection circuit 242 outputs the amplitude information to the control circuit 243.

The control circuitry 243 sets the gain set in accordance with the amplitude information to PGA 241 during the transmitting period. For example, the value of the gain may be predetermined for each range of the maximum amplitude. The control circuitry 243 outputs the enable signal ADen to the voltage comparator 2442.

In addition, the control circuitry 243 outputs a signal Gent indicating the set gain to the application. Gcnt is a binary number defined according to the gain. The application sets the thickness of the drawn line displayed on the screen based on Gcnt.

ADC 244 converts AD of the signal amplified by PGA 241.

The sample-and-hold circuit 2441 samples and holds the amplified signal during the reception period, and outputs the sampled and held signal to the voltage comparator 2442.

The voltage comparator 2442 compares the sampled and held signal with a reference voltage, and outputs a digital signal based on the comparison result. The voltage comparator 2442 is activated during reception by the enable signal ADen.

Figure 14:
FIG. 14 is a diagram for explaining an operation of a semiconductor device according to a first embodiment.
Figure 14:
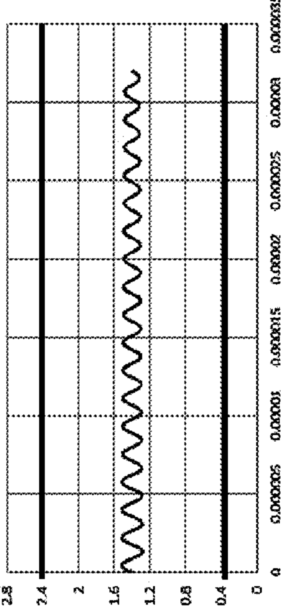
Figure 14:
Figure 14:
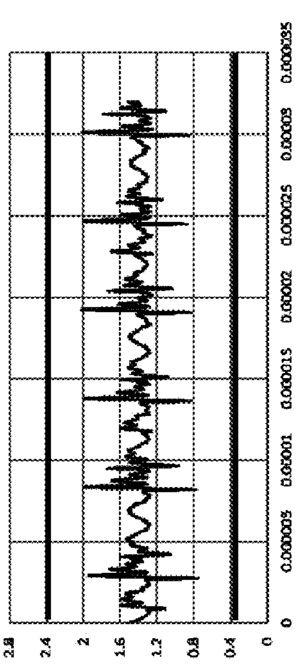

The upper diagram of FIG. 14 shows an input signal with low noise and an amplified signal with the input signal amplified. The gain is set to a large value (e.g., 4). When the surrounding environment is stable, high-precision drawing with low noise is possible. The following figure shows an input signal in a case where the noise is large and an amplified signal in which the input signal is amplified. The gain is set to a small value (e.g. ¾). When the ambient condition is not stable, Pen signal can be detected by amplifying the noise incoming signal.

The semiconductor device according to the first embodiment can detect a signal from an electronic pen in various environments without using a bandpass filter. Since the bandpass filter is not used, the circuit area of the semiconductor device 20 can be reduced.

Embodiment 2

Figure 16:
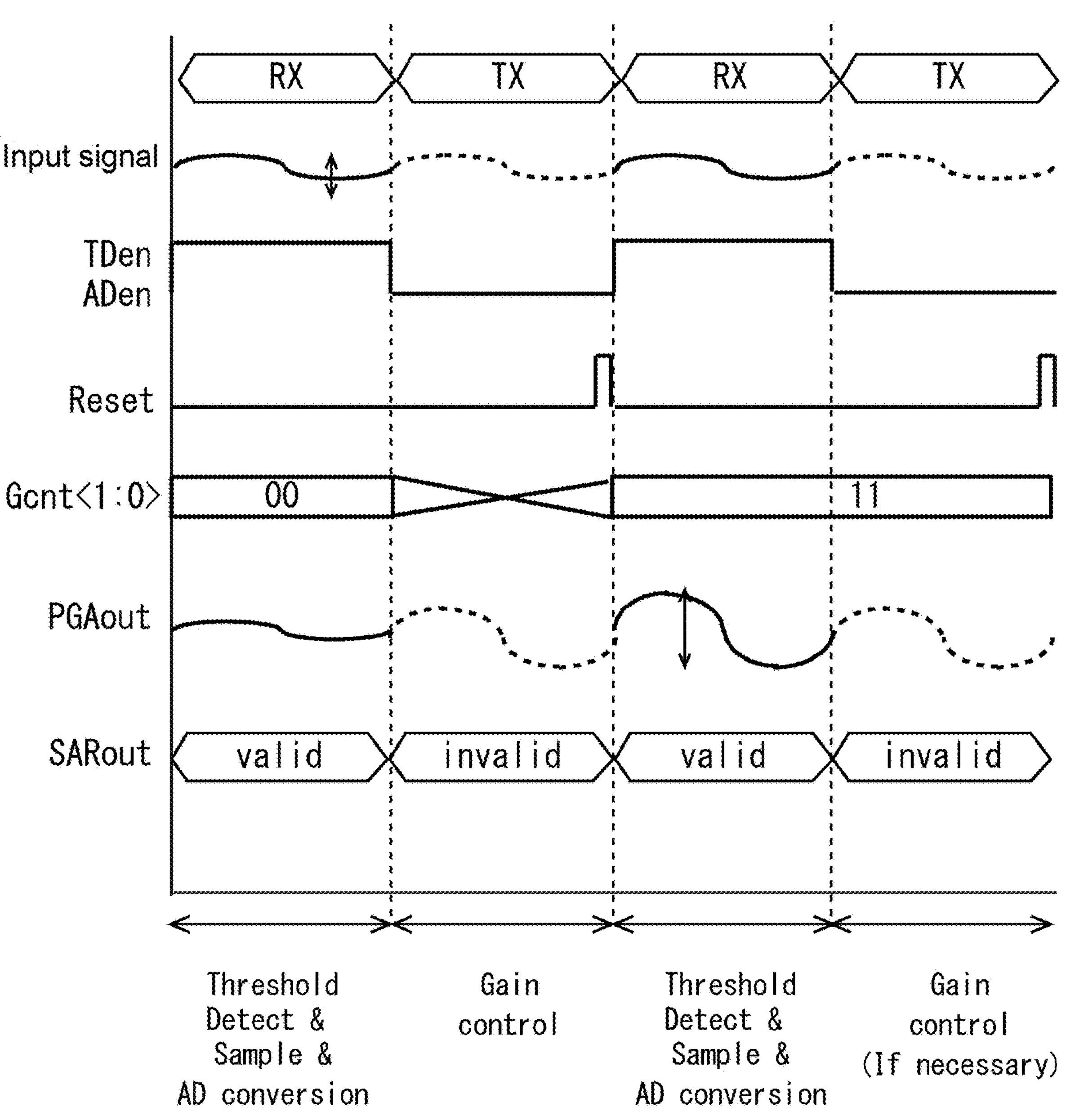
FIG. 16 is a diagram for explaining a temporal change of a signal in a gain control circuit according to a second embodiment.

Embodiment 2 is a specific example of Embodiment 1. FIG. 15 shows a configuration of the gain control circuit 24 according to the second embodiment, and FIG. 16 shows a temporal change of each signal. ADC 244 is a successive approximation type SAR (Successive Approximation Register) ADC.

PGA 241 outputs the amplified PGAout.

The threshold-detection circuitry 242 detects the amplitude of PGAout during reception (e.g., the maximal amplitude). The threshold detection circuit 242 outputs the amplitude information to the control circuit 243. The threshold-detection circuitry 242 is activated during reception by the enable-signal TDen. In addition, the threshold detector 242 is reset by the reset signal Reset.

The control circuitry 243 sets the gain according to the amplitude-information to PGA 241. The control circuitry 243 outputs a Gent indicating a gain. The control circuitry 243 outputs an enable signal TDen and an enable signal ADen. Referring to FIG. 16, TDen and ADen are High during the reception period and Low during the transmission period. In addition, the control circuit 243 outputs a signal Reset for resetting the threshold detection circuit 242 to the threshold detection circuit 242. The reset-signal Reset may be output at the end of the transmission-period, for example.

Referring to FIG. 15, ADC 244 includes a plurality of capacitors 41, a voltage-comparator 42, and SAR logic 43. One end of the capacitor 41 is connected to the input terminal of the voltage comparator 42. One of Vin (PGAout), Vrl, and Vrh is connected to the other end of the capacitor 41 under the control of SAR logic 43. Any known configuration may be used as the configuration of the successive approximation type ADC 244. SAR logic 43 is activated during reception by the enable signal ADen and outputs a digital signal as a SARout.

The gain control circuit 24 performs operation, sampling, and AD conversion of the threshold-detection circuit 242 during reception. The gain control circuit 24 sets the gain during the transmission period.

FIG. 17 shows an example of a circuit configuration of the threshold detection circuit 242. The threshold detecting circuitry 242 compares PGAout and the reference voltages by the voltage comparator CMP, and holds the comparison result in the latched LATCH. The comparison result includes information on the amplitude. The latching LA is activated by the enable signal TDen and is reset by the reset signal Reset. As shown in the diagram, the maximal amplitude may be detected based on the power of the respective voltage-comparator CMP.

The semiconductor device according to the second embodiment can achieve the same effects as those of the first embodiment.

Embodiment 3

Figure 18:
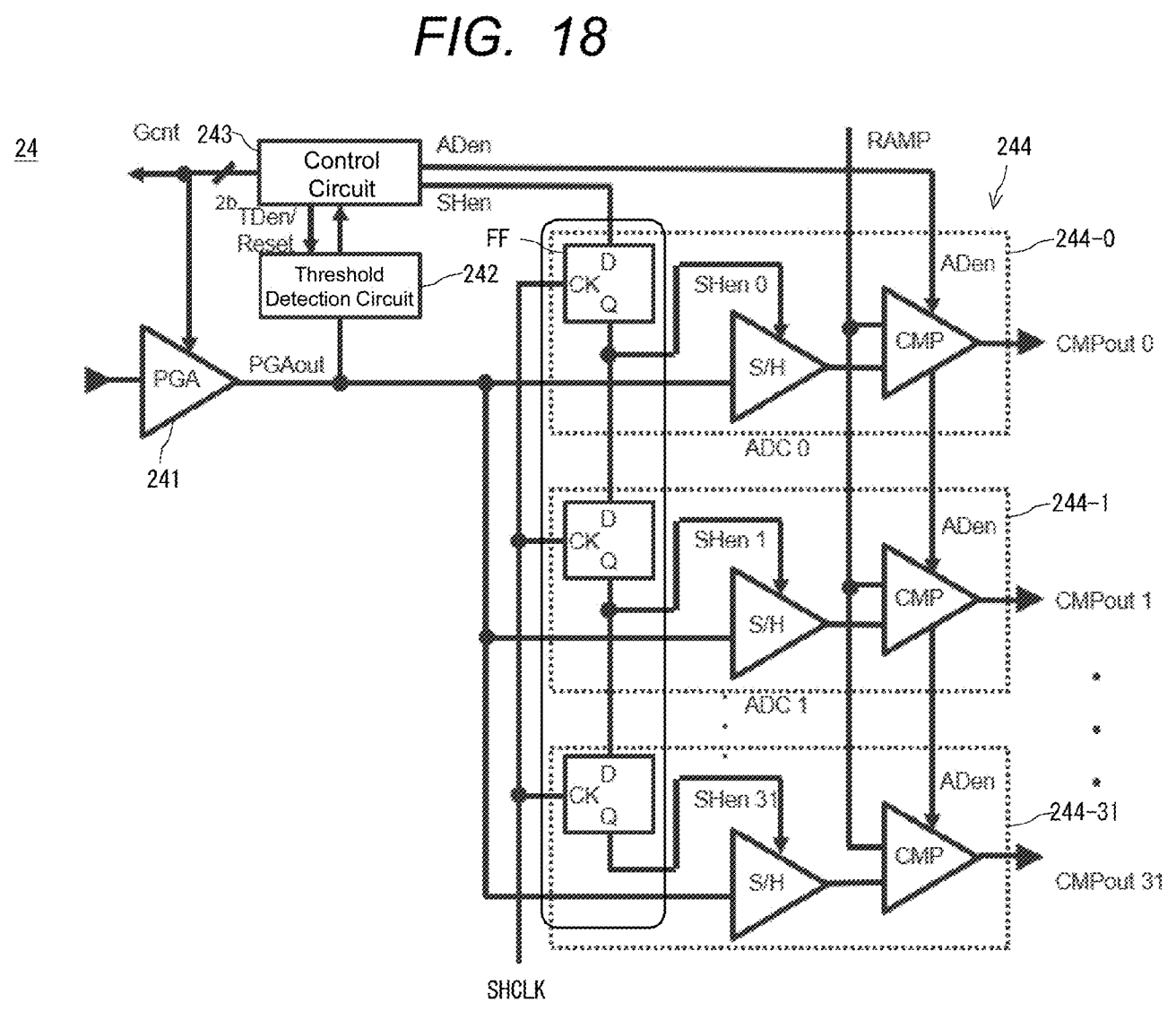
Figure 19:
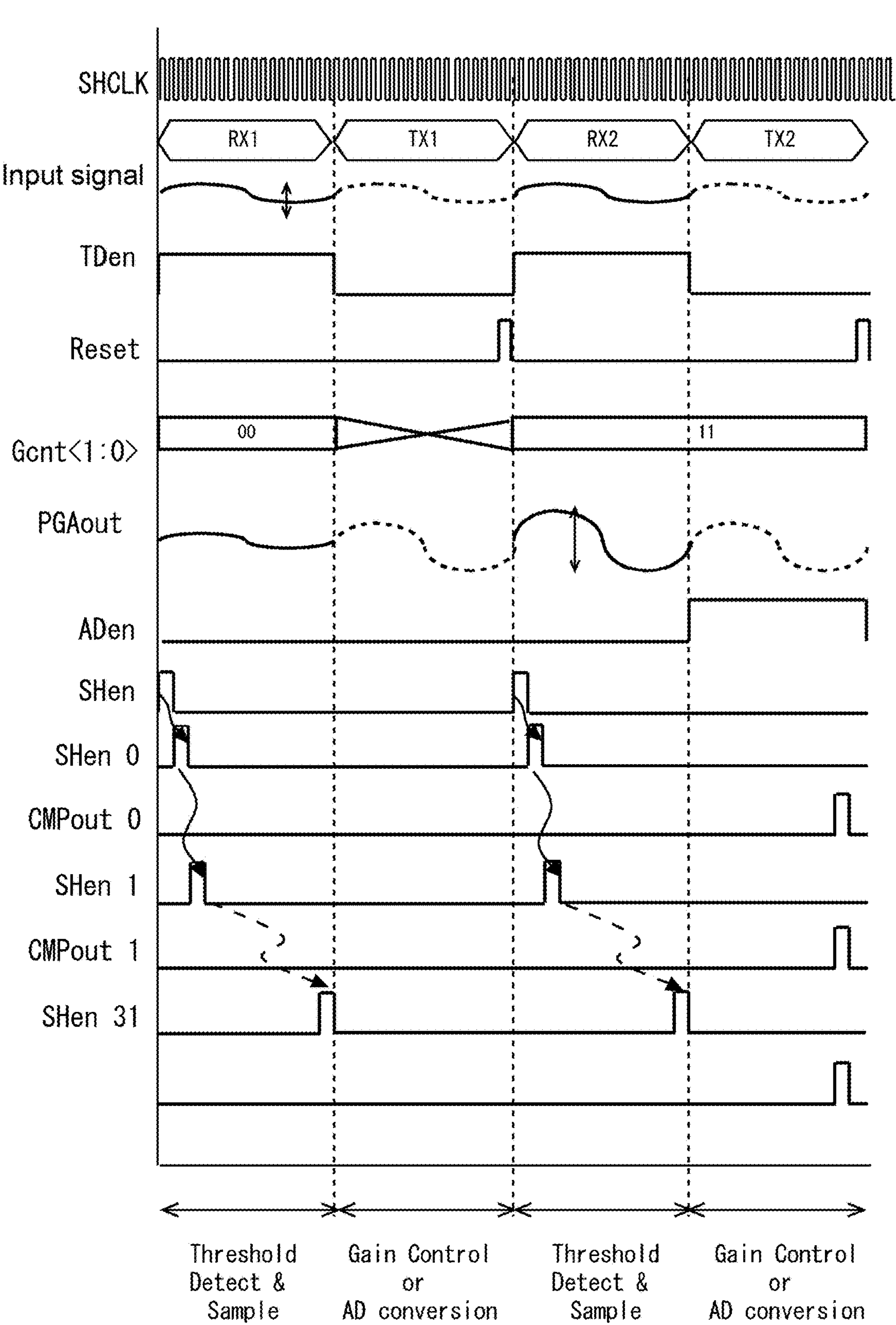
FIG. 19 is a diagram for explaining a temporal change of a signal in a gain control circuit according to a third embodiment.

FIG. 18 shows a configuration of the gain control circuit 24 according to the third embodiment, and FIG. 19 shows a temporal change of a signal. Although AD conversion is performed in the reception period with reference to FIG. 3, in the third embodiment, AD transform is performed in the transmission period. ADC 244 comprises ADC 244-0, ADC 244-1 to ADC 244-31. Each of ADC 244-0 to 244-31 comprises a flip-flop FF, a sample-and-hold circuitry S/H, and a voltage-comparator CMP. An enable SHen outputted from the control circuitry 243 is inputted to the flip-flop FF of ADC 244-0. The output of ADC 244-0 to 244-30 flip-flop FF is connected to the input of the flip-flop FF of ADC 244-1 to 244-31. The flip-flop FF of ADC 244-0 to 244-31 are inputted to the corresponding sample-and-hold circuits S/H as enable signals SHen0 to 31. The ramp signal RAMP and the sample-and-hold circuit S/H are supplied to the respective voltage comparators CMP. An enable signal ADeN is inputted to the respective voltage-comparators CMP.

Referring to FIG. 19, the first receive period is RX1, the next transmission period is TX1, the next reception period is RX2, and the next transmission period is TX2. SHen0 to 31 is successively turned High during reception, and the sampling circuitry of ADC 244-0 to 244-31 sequentially samples (captures) the incoming signal. Then, the 32 pieces of sampled data are AD converted together during the transmitting period (e.g., TX2). However, when the gain is changed (adjusted) during the transmission period, AD conversion is not performed during the transmission period (e.g., TX1).

The third embodiment can also achieve the same effects as the first embodiment.

Embodiment 4

Figure 20:
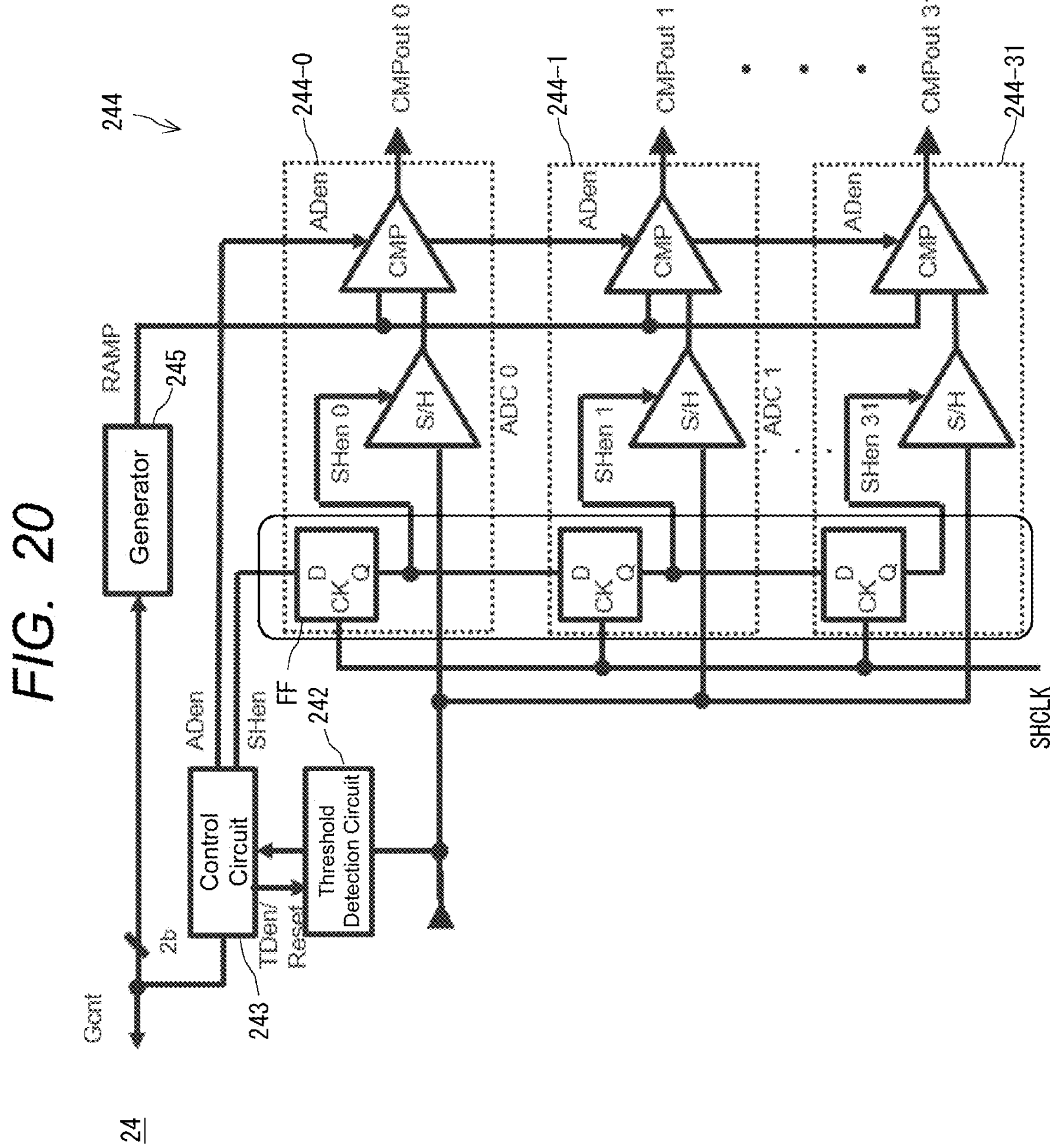
FIG. 20 is a diagram for explaining a configuration of a gain control circuit according to a fourth embodiment.
Figure 21:
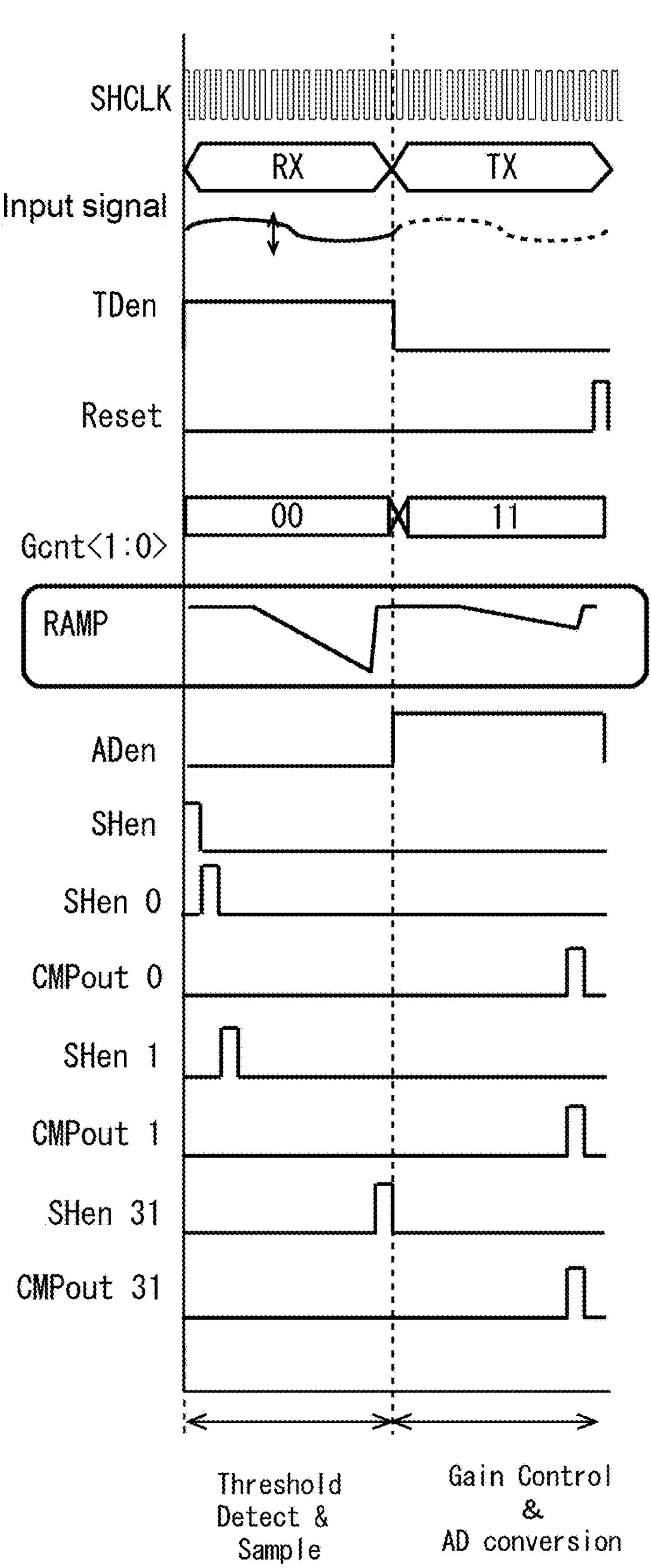
FIG. 21 is a diagram for explaining a temporal change of a signal in a gain control circuit according to a fourth embodiment.

Embodiment 4 is a modification of Embodiment 3. Although AD conversion is performed in the reception period with reference to FIG. 3, in the fourth embodiment, AD transform is performed in the transmission period. FIG. 20 shows a configuration of the gain control circuit 24 according to the fourth embodiment, and FIG. 21 shows a temporal change of a signal. The gain control circuitry 24 does not comprise a PGA 241, but instead comprises generators 245.

The generator 245 outputs a ramp signal whose amplitude is limited in accordance with Gcnt. The amplitude or absolute value of the ramp signal is configured to be controllable based on the amplitude information. As in the third embodiment, ADC 244 converts the 32 pieces of sampled data into AD at the same time.

By using the ramp signal with limited amplitude, the fourth embodiment can achieve the same effect as the first embodiment. In addition, since the gain is changed immediately before AD conversion, an extra sample-and-hold period is not required. Also, no PGA 241 is required.

Although the invention made by the present inventors has been described in detail based on the embodiments, it is needless to say that the present invention is not limited to the above-described embodiments and can be variously modified without departing from the gist thereof.

What is claimed is:

1. A semiconductor device comprising:

a transmission circuit configured to output an analog signal; and a receiving circuit configured to receive an input signal which is transmitted from a target object in response to the analog signal, wherein the semiconductor device operates by alternately repeating a transmission period that to transmit the analog signal and a reception period that to receive the input signal, wherein the receiving circuit comprises a gain control circuit configured to sample the input signal during the reception period, and to control a gain of the receiving circuit based on the sampled input signal during the transmission period, wherein the gain control circuit comprises:

a gain adjustment circuit configured to amplify the input signal according to the gain, and an analog-to-digital converting circuit configured to analog-to-digital convert the amplified input signal, wherein the gain adjustment circuit comprises:

a threshold detection circuit configured to detect an amplitude information related to an amplitude of the input signal;

a setting control circuit configured to set the gain during the transmission period; and an output circuit configured to output the gain set by the setting control circuit, and wherein the threshold circuit comprises:

a holding circuit configured to hold the amplitude information during the reception period; and a reset circuit configured to reset the amplitude information when the reception period finishes.

2. The semiconductor device according to claim 1, wherein the threshold detection circuit and the gain adjustment circuit are disposed near the receiving circuit than the analog-to-digital conversion circuit in the gain control circuit.

3. The semiconductor device according to claim 1, wherein the analog-to-digital conversion circuit comprises a sample-and-hold circuit and a voltage comparation circuit, and is activated while the amplitude information is held during the reception period.

4. The semiconductor device according to claim 1, wherein the analog-to-digital conversion circuit comprises a plurality of sample-and-hold circuits and a plurality of voltage comparation circuits, wherein the plurality of the sample-and-hold circuit sample the amplified input signal at different timings, and wherein the analog-to-digital conversion circuit is activated while the gain is not adjusted during the transmission period.

5. The semiconductor device according to claim 1, wherein the analog-to-digital conversion circuit comprises a plurality of sample-and-hold circuits and a plurality of voltage comparation circuits, and wherein the plurality of the voltage comparation circuits inputs a reference voltage, and are configured to control an amplitude or its absolute value of the reference voltage based on the amplitude information.

* * * * *